United States Patent [19]

Kimura

[11] 4,228,590
[45] Oct. 21, 1980

[54] LEVELING POLE

[76] Inventor: Shinhichi Kimura, 2-11, Kita, 4-chome, Imazu, Tsurumi-ku, Osaka, Japan

[21] Appl. No.: 20,988

[22] Filed: Mar. 16, 1979

[51] Int. Cl.³ ............................ G01B 3/10; G01B 3/08; G01C 15/00
[52] U.S. Cl. ........................................ 33/138; 33/161; 33/296
[58] Field of Search ...................... 33/137 R, 138, 161, 33/296

[56] References Cited

U.S. PATENT DOCUMENTS

| | | | |
|---|---|---|---|
| 1,079,457 | 11/1913 | Wesson | 33/137 R |
| 2,028,836 | 1/1936 | Holgate | 33/137 R |
| 3,680,214 | 8/1972 | Quenot | 33/161 |

FOREIGN PATENT DOCUMENTS

1200500  6/1959  France ........................................ 33/161

*Primary Examiner*—Steven L. Stephan
*Attorney, Agent, or Firm*—Moonray Kojima

[57] ABSTRACT

A leveling pole comprising telescopically slidable inner liners, wherein an outermost liner is provided detachably with a case for receiving a tape-line connected to an innermost liner through the outermost liner and each inner liner except for the innermost liner, the tape-line being bilaterally graduated in selected two kinds of linear measure systems to alternatively indicate one of the graduations corresponding to the movement of each inner liner to and from the outermost liner through an aperture which is formed on the case and covered with a shutter slidable across the aperture. The invention further involves the art wherein a hook is detachably mounted onto the foremost end of the innermost liner thereby making it possible to measure the height of an object exceeding the total length of the pole.

3 Claims, 4 Drawing Figures

U.S. Patent  Oct. 21, 1980  4,228,590
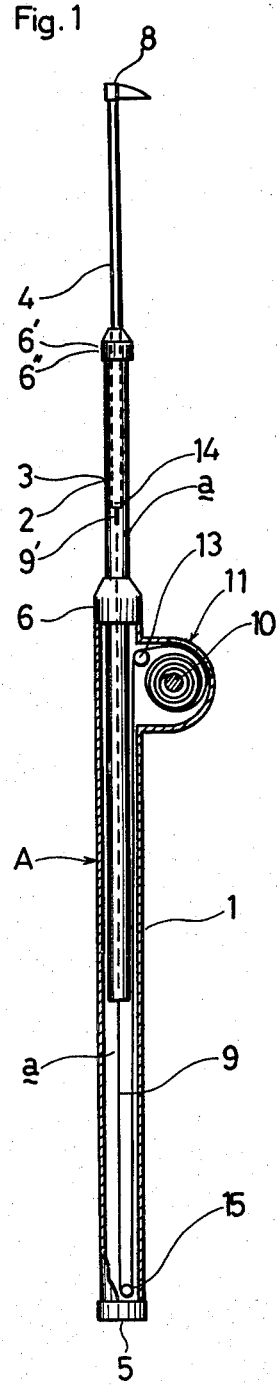
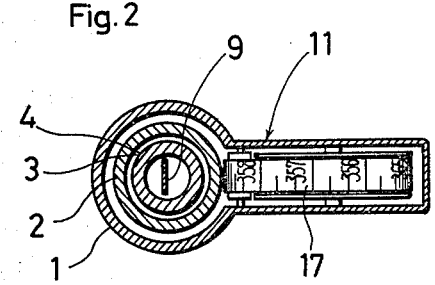
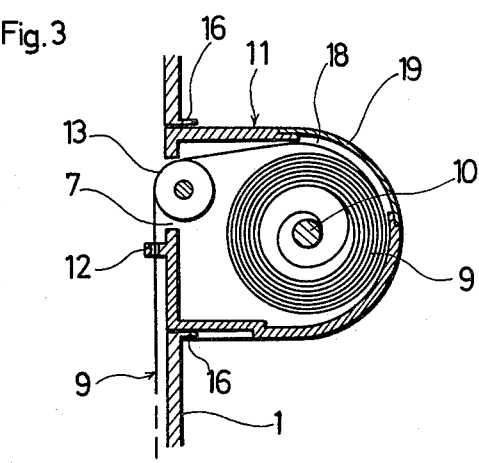
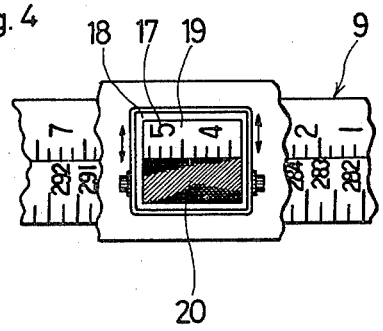

LEVELING POLE

BACKGROUND OF THE INVENTION

The present invention relates generally to improvements in a leveling pole, and more particularly to an improved type measuring instrument usable for measuring the height, length and width of objects or spatial dimensions in the fields of forestation, riparian operation, road building and construction work.

Most of the conventional leveling poles in general use comprise an outer liner member and a plurality of inner liner members inserted therein in telescopically slidable relation to each other so that when an operator wants to learn the exact height of a tree, for example, he may pull the inner liner members out of the outer liner member in regular increasing diameter sequence until the extremity of the innermost liner member reaches the treetop.

According to this, however, he cannot learn the height of the tree without reducing the full length of the outermost liner member from the length of the extended pole even after reading the latter length by graduations which are scaled up on the pole in reverse numeral order.

In order to eliminate the above-mentioned disadvantages of the conventional leveling poles, there has recently been developed a novel type of leveling pole wherein a tape-line is housed to enable an operator to digitally read the height of an object to be measured. However, in most cases the tape-line is made of such a steel strap material that when each liner member is pulled out or pushed into the outer liner member, the tape-line is also paied out or rolled in, always bringing about a rustling noise jarring on the ear caused by being rubbed against some inner wall portions of each member.

Further when an operator with the above-mentioned leveling pole works by a telegraph post or under a high-tension wire, he must always be exposed to the danger of an electric shock.

STATEMENT OF OBJECTS

Accordingly, the present invention has been designed to eliminate all the above-mentioned drawbacks and disadvantages of the conventional leveling poles, and has as one of its main objects the provision of a leveling pole having construction that according as inner liner members are slid one after another within an outer liner member, the exact length between the bottom end of the outermost liner member and the foremost end of the innermost liner member is digitally indicated.

Another object of the invention is to provide a leveling pole housed with a tape-line having graduations scaled up in the metric system and the yard system or in any other suitable linear measure system.

A further object of the invention is to provide a leveling pole having construction that the length of an object beyond the fully extended length of the pole can be exactly measured.

A still object of the invention is to provide a leveling pole which is light in weight, easy to carry with an operator and completely insulated free of an electric shock.

BRIEF DESCRIPTION OF THE DRAWING

How the foregoing objects and advantages are attained will appear more fully from the following description referring to the accompanying drawing, in which:

FIG. 1 is a side elevation partly in section showing an illustrative leveling pole of the invention;

FIG. 2 is a cross section view showing elemental parts thereof;

FIG. 3 is a vertical cross section showing as to how a tape-line case is mounted to the pole of the invention; and FIG. 4 is a top plan view showing the construction of an indication shifting or shutting means.

DESCRIPTION OF INVENTION IN RELATION TO DRAWING

Setting forth now in detail a few preferred embodiments of the present invention with reference to the accompanying drawing, reference character A generally designates a leveling pole body which is preferably made of a very thin and light fiberglass reinforced plastics material, comprising an outermost liner member 1, inner liner members 2, 3 and an innermost liner member 4 inserted in telescopically slidable within each other and having a true circular cross section. Said outermost liner member 1 is provided in its lowermost end with a butt end 5 made of rubber or synthetic resin and in its uppermost end with a non-skid ring 6 so that when the inner liner member 2 is slid freely in the axial direction thereof, the member 2 is held in position wherein it has just been slid within the outermost liner member 1. Similarly, the inner liner members 2 and 3 are provided in their respective uppermost end with non-skid rings 6' and 6" that fulfill the same function as the non-skid ring 6.

In a suitable peripheral surface of said member 1 in adjacency to said non-skid ring 6 there is bored a tape-line insertion aperture 7. On the extremity of the innermost liner member 4 there is mounted a hook 8. Numeral 9 denotes a tape-line which is tightly stretched within the inner hollow portion a of the leveling pole A. One end of said tape-line 9 is, with the other end connected to an end of a coil spring 10 rigidly fixed intermediate of a tape-line case 11, inserted into said inner hollow portion a through the tape-line insertion aperture 7, a guide 12 and a roller 13, being connected to the lowermost end 14 of the innermost liner member 4 through a roller 15 which is swivelled within the lowermost end of the outermost liner member 1. Then the tape-line case 11 is engaged with the outermost liner member 1 by being forced into a flange 16 protruded from the tape-line insertion aperture 7.

As is shown in FIGS. 2 and 3 the tape-line 9 is preferably made of such a water-repelent material as a synthetic resin and marked bilaterally with graduations 17 scaled up in two kinds of linear measures such for example as in the metric system and the yard system.

Further said tape-line case 11 is bored with an aperture 18 covered with a transparent plate 19 and has a shutter or shifting means 20 mounted in slidable relation with respect to the direction transversing the axis of the plate 19 so that an operator is able to read the graduation indicated in selected one of said two linear measure systems by sliding the shutter 20 across the aperture 18.

Preferably the tape-line case 11 is disposed in substantially lower place than an operator's eye and adapted to indicate in the center line transversing the axis of the aperture 18 the graduation 17 that indicates the full length of the outermost liner member 1 when the leveling pole A is collapsed to its shortest length. By this arrangement, each graduation 15 can be seen through the aperture 18 and the transparent plate 19 that shows the total length of the leveling pole A according as the inner liner members 2 to 4 are extended from the outermost liner member 1 in regular increasing diameter sequence, thereby making it unnecessary for an operator to add the length of the outermost liner member 1 to the value indicated by the graduation 17.

In the preceding embodiment, description has been made of the construction of the leveling pole A which enables an operator to learn the length of an object, and especially of the height of an upright standing object which is equal to, or less than, the maximum length of the extended leveling pole A.

Generally speaking, when an operator is practically engaged in leveling operation by use of a conventional leveling pole, he is often subjected to the case wherein an object he wants to measure is longer or higher than the total length of the fully extended leveling pole, thus making it necessary for him to always carry with him another leveling pole which is longer in length than the pole in frequent use. According to the present invention, however, it is possible to learn any longer length of an object than the aforesaid pole A by carrying out the following embodiment, wherein a hook 8 is detachably fixed to the extremity of the innermost liner member 4 by means of a suitable pin means (not shown in the drawing) and directly connected to the end of the tape-line 9. By so arranging, he is able to measure the height of an object which is beyond the total length of the fully extended leveling pole A but within the range of this length when the leveling pole A is vertically raised by the hand of the operator standing erect. In this case, any suitable position of the object engageable with the hook 8 is located by an operator and the pin is removed from the hook 8. Thereafter the operator raises up the fully extended pole A to said position, engage the hook 8 therewith and then put the pole A down vertically until the butt end 5 reaches the ground or the plane close to his feet. In this case, the tape-line 9 is vertically extended outward from the uppermost end or extremity of the innermost liner member 4 whereby the operator is able to measure the height of the object exceeding the total length of the fully extended leveling pole A.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A portable measuring pole comprising
   (A) a circular cylindrical hollow outer pole having a first diameter, a top end, a bottom end, and having an opening in the vertical wall thereof toward said top end;
   (B) a first roller means positioned within said outer pole toward said bottom end thereof;
   (C) a plurality of circular cylindrical hollow inner poles having diameters successively smaller than said first diameter and positioned to telescope within each other and within said outer pole, said inner poles having top ends and bottom ends;
   (D) a non-skid ring disposed at the top end of said outer pole and at the top end of each of said inner poles except the innermost pole, for holding the next inner pole at an extended position;
   (E) end means disposed at the top end of said innermost pole;
   (F) a flat plastic tape of a predetermined length and width and having side by side on one surface thereof two sets of calibrated measurements;
   (G) spring wound means for holding said plastic tape in a wound position when said outer pole and said inner poles are telescoped in a closed position and for enabling the tape to be under tension when said tape is rolled out upon extension of said innermost pole;
   (H) casing means of substantially circular cylindrical shape and having the diameter portion as an end portion for tightly and detachably fitting to said outer pole with the end portion thereof fitting into said opening of said vertical wall of said outer pole with the axis of said casing disposed transverse to the axis of said outer pole, said casing means comprising means for holding said spring means and said plastic tape therein, second roller means disposed within said casing, and guide means disposed on said casing to be positioned within said outer pole when said casing is attached to said outer pole at said opening in said outer pole, said casing also having an aperture at the top of the cylindrical wall of said casing, transparent means for covering said aperture, and movable opaque means disposed in said aperture for blocking substantially one half of the width of said tape thereby to enable reading through said transparent means of one set or the other set of calibrated measurements; whereby said tape is treaded along said second roller means within said casing, then outside of said casing and within said guide means, and then down through the inside of said outer pole and then around said first roller means located at the bottom end of said outer pole, and then attached to one end of said innermost pole; and wherein said inner poles are extendable by manual means to a desired length with said non-skid rings holding by friction the inner poles next adjacent in the extended position; and whereby said tape is wound out to correspond to the point to point measurement, at said aperature of said casing, of the measurement from the bottom end of said outer pole to the top end of said innermost pole.

2. The pole of claim 1, wherein said end means comprises a hook detachably connected at the top end of said innermost pole and wherein said tape is threaded within the inner pole and connected to said hook.

3. The pole of claim 1, wherein said tape is attached to the bottom end of said innermost pole.

* * * * *